(12) United States Patent
Challener

(10) Patent No.: US 7,095,859 B2
(45) Date of Patent: Aug. 22, 2006

(54) MANAGING PRIVATE KEYS IN A FREE SEATING ENVIRONMENT

(75) Inventor: David Carroll Challener, Raleigh, NC (US)

(73) Assignee: Lenovo (Singapore) Pte. Ltd., (SG)

(*) Notice: Subject to any disclaimer, the term of this patent is extended or adjusted under 35 U.S.C. 154(b) by 866 days.

(21) Appl. No.: 10/100,446

(22) Filed: Mar. 18, 2002

(65) Prior Publication Data

US 2003/0174842 A1    Sep. 18, 2003

(51) Int. Cl.
*H04L 9/00* (2006.01)
*H04L 9/32* (2006.01)

(52) U.S. Cl. .................. 380/282; 380/285; 713/155; 726/3

(58) Field of Classification Search .................. 713/155
See application file for complete search history.

(56) References Cited

U.S. PATENT DOCUMENTS

| | | | |
|---|---|---|---|
| 5,345,506 | A | 9/1994 | Tsubakiyama et al. |
| 6,075,860 | A | 6/2000 | Ketcham |
| 6,199,113 | B1 | 3/2001 | Alegre et al. |
| 6,233,341 | B1 | 5/2001 | Riggins |
| 6,256,735 | B1 | 7/2001 | Maria |
| 6,263,446 | B1 | 7/2001 | Kausik et al. |
| 6,839,838 | B1* | 1/2005 | Fukuda .................. 713/168 |

OTHER PUBLICATIONS

Norman Y. Mineta, Secretary, U.S. Department of Commerce; Cheryl L. Shavers, Under Secretary for Technology, U.S. Department of Commerce; Raymond G. Kammer, Director of National Institute of Standards and Technology, U.S. Department of Commerce, The Keyed-Hash Message Authentication Code (HMAC), Federal Information Processing Standard Publication, FIPS PUB #HMAC, pp. 1-8, U.S. Government Printing Office, Washington, D.C. 2000.

FRC No. 2403, "The Use of HMAC-MDS-96 within ESP and AH", Nov. 1998.

FRC No. 2104, HMAC: Keyed-Hashing for Message Authentication, Feb. 1997.

* cited by examiner

Primary Examiner—Kambiz Zand
(74) Attorney, Agent, or Firm—Carlos Munoz-Bustamante; Dillon & Yudell LLP

(57) ABSTRACT

A method and system for storing to a server a private key that was created on a TCPA-enabled client computer by the user. The user's private key is wrapped in a server non-migratable public key and sent to the server. When the user wants to migrate the user private key to a TCPA-enabled client computer, the user sends a request to the server for the user's private key along with the user's personal migration data for user identification. The server wraps the user's private key in the TCPA-enabled client computer's non-migratable public key, and transmits this "blob" to the client computer, which unwraps the blob to reveal the user's private key.

16 Claims, 5 Drawing Sheets

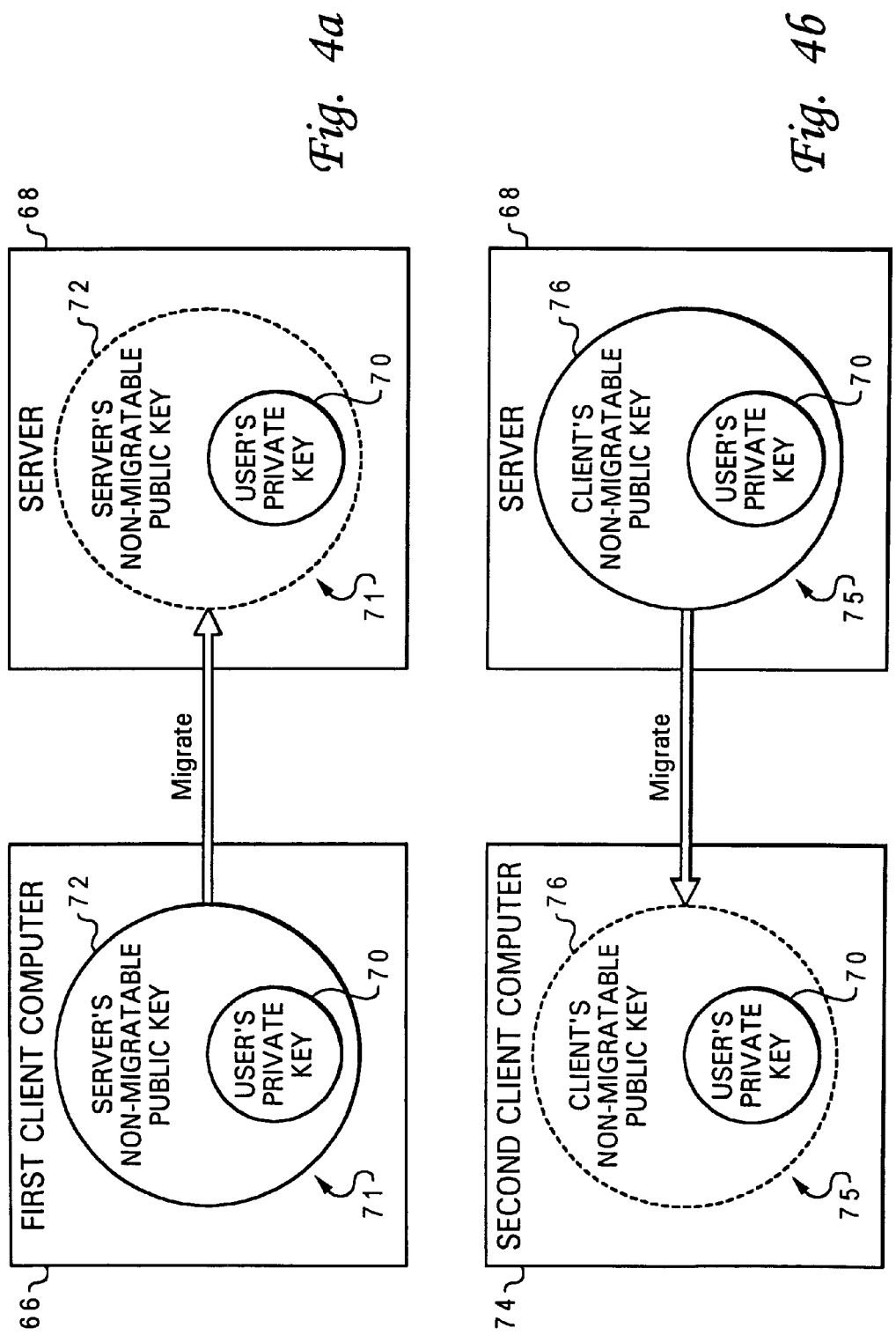

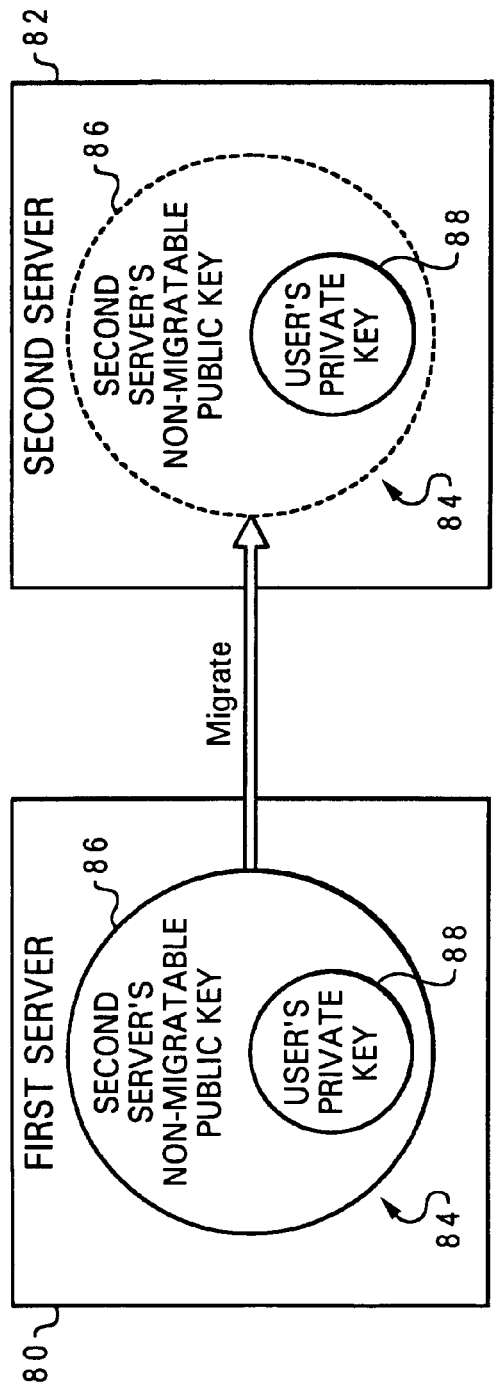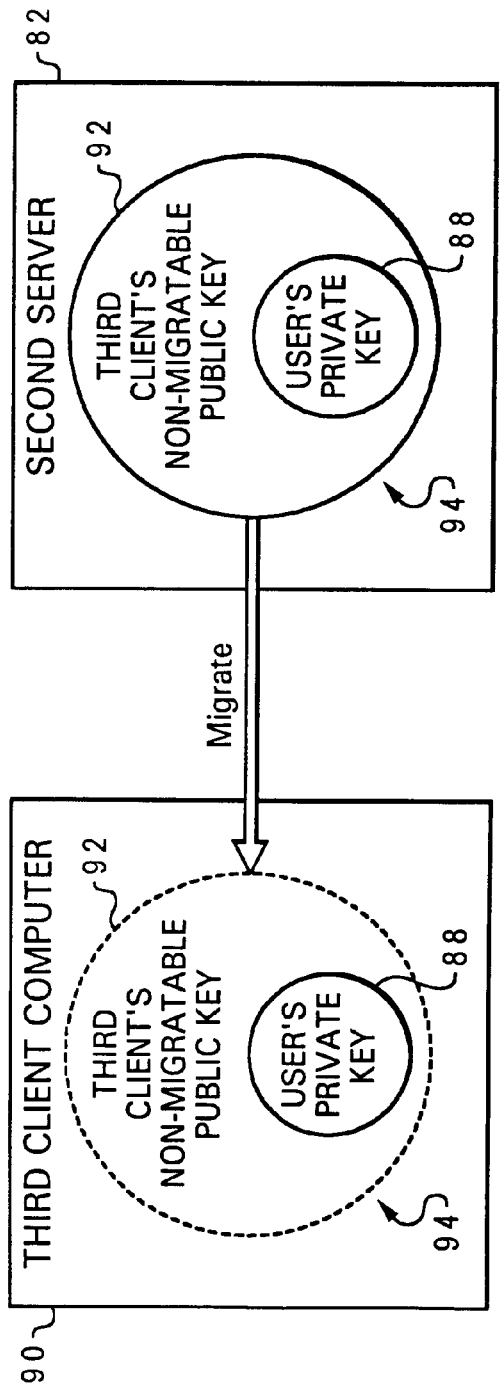

MANAGING PRIVATE KEYS IN A FREE SEATING ENVIRONMENT

BACKGROUND OF THE INVENTION

1. Technical Field:

The present invention relates in general to the field of computers, and, in particular, to encryption and decryption of data communicated between computers. Still more particularly, the present invention relates to an improved method and system for storing user cryptology keys on a server by a client user.

2. Description of the Related Art:

Personal computers and computer networks, including the Internet, are designed to be open and flexible for ease of access to users. However, this openness presents security problems when confidential communication between computers is desired, such as when transmitting messages containing financial information, business secrets, personal information, etc. To provide security for communications between two computers in such a network, messages are often encrypted. Encryption typically is performed using a cryptology key ("key"), which is a cipher having a predetermined value, that is applied using an algorithm to a string or block of unencrypted data to produce encrypted data, or to decrypt encrypted data. Encryption that uses the same key to encrypt and decrypt a message is known as symmetric-key cryptography. Symmetric-key cryptography systems are simple and fast, but their main drawback is that the two parties must somehow exchange the key in a secure way. A second type of encryption, asymmetric encryption, avoids this problem by using two keys: a public key and a private key. The public key is available to anyone to encode a message to be sent to a receiving user. The private key is available only to the receiving user to decrypt the message. Alternatively, the private key may be used to encrypt the message and the public key may be used to decrypt the message. A popular method using asymmetric encryption is known as a Public Key Infrastructure (PKI).

PKI consists of a certificate authority (CA) that issues and verifies to the users a digital certificate, which includes the public key. The CA simultaneously creates the public key and the private key. The public key is made publicly available as part of the digital certificate in a directory that all parties can access, while the private key is given only to the requesting party. Typically, the public key is used to encrypt data, and the private key is used to decrypt the data. A popular algorithm used in encryption and authentication systems using public and private keys is RSA, named in 1977 for its inventors Ron Rivest, Adi Shamir and Leonard Adleman. RSA uses two large random prime numbers that are multiplied together and manipulated with modulus arithmetic such that the receiver holding the private key can decrypt any message from any party that has been encrypted with the public key. Other popular cryptographic algorithms include those based on a Secure Hash Algorithm (SHA), an Advanced Encryption Standard (AES) used by U. S. Government organizations, a Data Encryption Standard (DES) and Hashing Message Authenticating Code (HMAC).

In response to a need to enhance the security of computer systems, the industry working group Trusted Computing Platform Alliance (TCPA) was formed in October 1999 by Compaq Computers, Inc. (Compaq), Hewlett-Packard Corporation (HP), International Business Machines Inc. (IBM), Intel Inc. and Microsoft Inc. The TCPA has established standards for embedding security functionality in computer systems. TCPA Main Specification Version 1.1 is a standard defining how a computer system can utilize asymmetric encryption by creating its own public/private key pairs in a TCPA subsystem of the computer system, in a manner analogous to that of a CA in a PKI. The TCPA subsystem, typically using a hardware chip called a Trusted Platform Module (TPM), uses cryptographic algorithms based on RSA, DES, SHA, HMAC and AES to generate public/private key pairs. A TCPA-enabled computer contains a TPM or a TPM equivalent, and is able to perform cryptology functions as defined by the TCPA standards.

After generating a private encryption key, typically an RSA 2048-bit private key, a TCPA-enabled computer stores unprotected private encryption keys in memory accessible only to the TPM. Thus, only the TCPA-enabled machine that generated a private key in its TPM has access to that private key. A user is unable to use any computer other than the one that generated the private key, and thus "free seating" at any public or network computer does not allow the user access to his private key for encrypting messages and data. To address this problem, one solution the prior art offers is "smart cards."

A smart card is a small device the size of a credit card that contains memory and possibly processing logic. The smart card stores a user's private key, which is downloaded from a TCPA-enabled machine that generated the user's private key, in a nonvolatile memory in the smart card. The smart card is inserted into any computer having a smart card reader. The smart card reader reads the private key from the smart card, typically after the user has typed a password into the computer, and loads the user's private key in the computer's memory. Three main weaknesses of smart cards are 1) only computers with smart card readers can use smart cards; 2) smart card readers can be tampered with to "steal" the private key from the smart card and store it in a location known by the pirate who tampered with the smart card reader; and 3) the smart card can be lost or stolen.

Thus, there is a need for a method and system that allows a user to free seat at any TCPA-enable computer using the user's private key without the need of additional hardware or hardware interface.

SUMMARY OF THE INVENTION

The present invention provides a method and system for migrating and storing to a server a private key that was created on a TCPA-enabled client computer by the user.

The user's private key is encoded ("wrapped") with a non-migratable storage key of the server to form a first "blob." The term "non-migratable" described that attribute of the public key that prohibits the blob formed by the non-migratable public key to be subsequently migrated out of the server.

When the user wants to migrate the user's private key from the server to a TCPA-enabled client computer, the user sends a request to the server for the user's private key. Also included with the request is proof that the user knows the user's personal migration data for user identification. The server wraps the user's private key with the TCPA-enabled client computer's non-migratable public key, and transmits this second blob to the client computer, which then unwraps the blob to reveal the user's private key. The user is thus able to access the user's private key from any TCPA-enabled client computer in a free-seating environment by storing the user's private key at the server.

In a preferred embodiment, a system administrator determines which client computers in a network can migrate a user's private key to a server. The user may then migrate the user's private key to the server in a subsequently non-migratable form, assuring that the user's private key is not migrated further to an unauthorized computer. The system administrator also determines which client computers may receive the user's private key through migration, thus assuring that only computers in locations authorized by the system administrator receive the user's private key. For example, if the user's private key allows access to top secret information, the system administrator may wish to prevent a user from using a computer located at the user's non-secure house. Thus, the system manager decides which computers in a secure location a user may use in a free-seating arrangement, with access to the user's private keys. In another preferred embodiment, the user's private key is migrated from one server to another, including servers at remote locations. For example, a server on one military post may migrate the user's private key to a server on another military post. Thereafter, the user can freely sit at any terminal on either post and access the user's private key.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIGS. 4a–4b depict a migration of the user's private key from a first client computer and a server, and then from the server to a second client computer; and FIGS. 5a–5b illustrate a migration of the user's private key from a first server to a second server.

DETAILED DESCRIPTION OF THE PREFERRED EMBODIMENT

Figure 1:
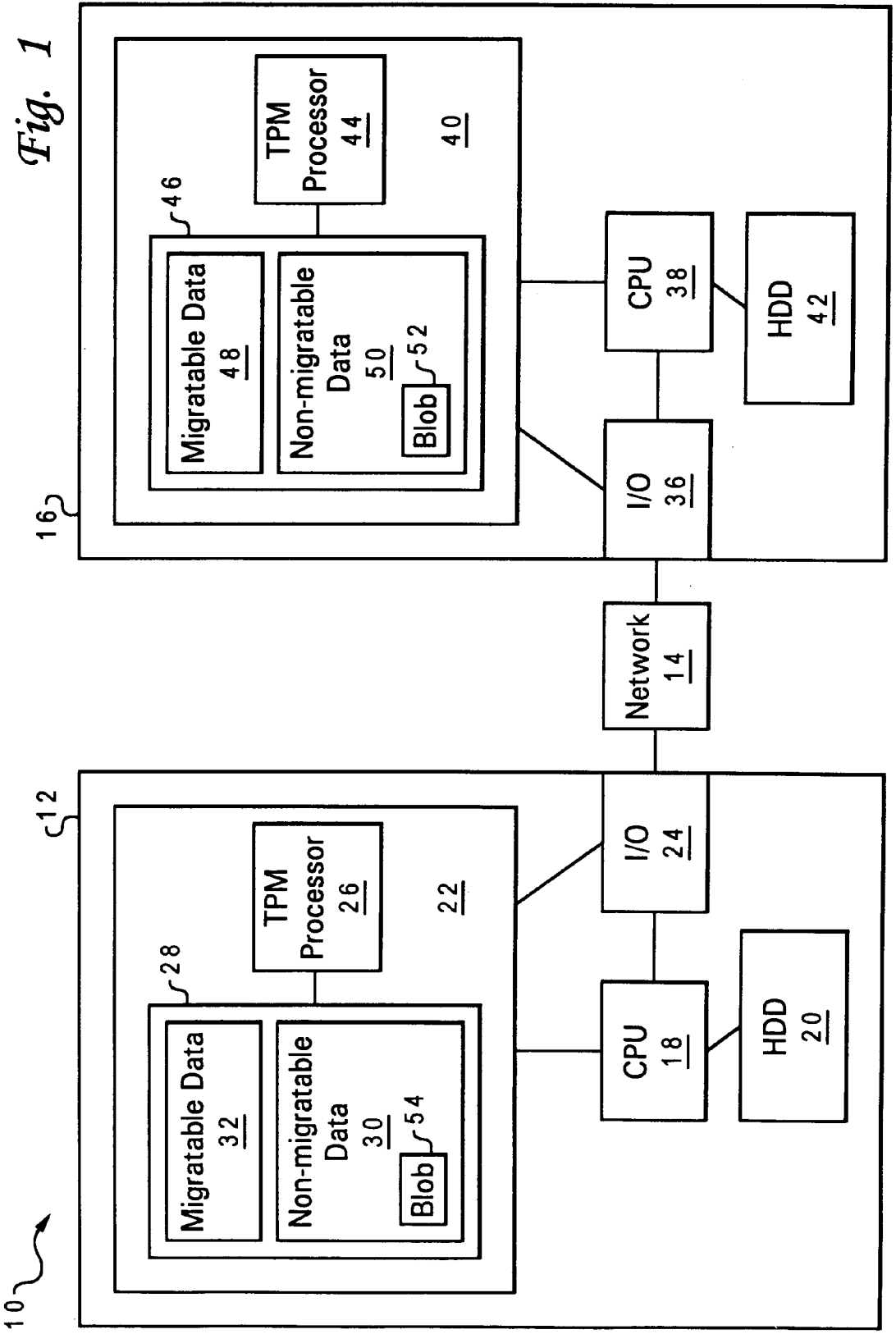
FIG. 1 is a block diagram of a computer network having Trusted Computer Platform Alliance (TCPA) enabled computers.

With reference now to the drawings and in particular to FIG. 1, there is depicted a block diagram of a computer system 10 used in a preferred embodiment of the present invention. Computer system 10 includes at least one Trusted Computing Platform Alliance (TCPA) enabled client computer 12 connected via a network 14 to at least one TCPA-enabled server 16.

Client computer 12 includes a central processing unit (CPU) 18, which is attached to a storage device 20, which is preferably a hard disk drive (HDD) or alternatively any other type of mass data storage device. CPU 18 may be a single computer processor, or preferably is composed of multiple processors operating together. Also attached to CPU 18 is a Trusted Platform Module (TPM) 22. TPM 22 is the hardware instantiation of a TCPA subsystem. The TCPA subsystem, whose specification is described in TCPA Main Specification Version 1.1 and TCPA PC Specific Implementation Specification, Version 1.00, which are incorporated herein by reference, includes TPM 22 and software to control the TCPA subsystem. Within TPM 22 is a TPM processor 26 and a TPM memory 28, which is able to store migratable data 32 and non-migratable data 30. As the name indicates, migratable data 32 may be migrated to another computing device, while non-migratable data 30 may not. Coupled to TPM 22 and CPU 18 is an Input/Output (I/O) 24, a circuit capable of interfacing and communicating with other devices such as server 16 through computer network 14. Computer network 14 may be a local area network (LAN) or a wide area network (WAN) such as an Internet.

CPU 18 communicates with TMP 22 via I/O 24 to obtain symmetric encryption keys and to request TPM 22 to perform various public/private key operations. TPM 22 includes a TPM processor 26, which is capable of encoding/decoding messages received from I/O 24, as well as generating asymmetric pairs of public/private keys for cryptological use.

Figure 2:
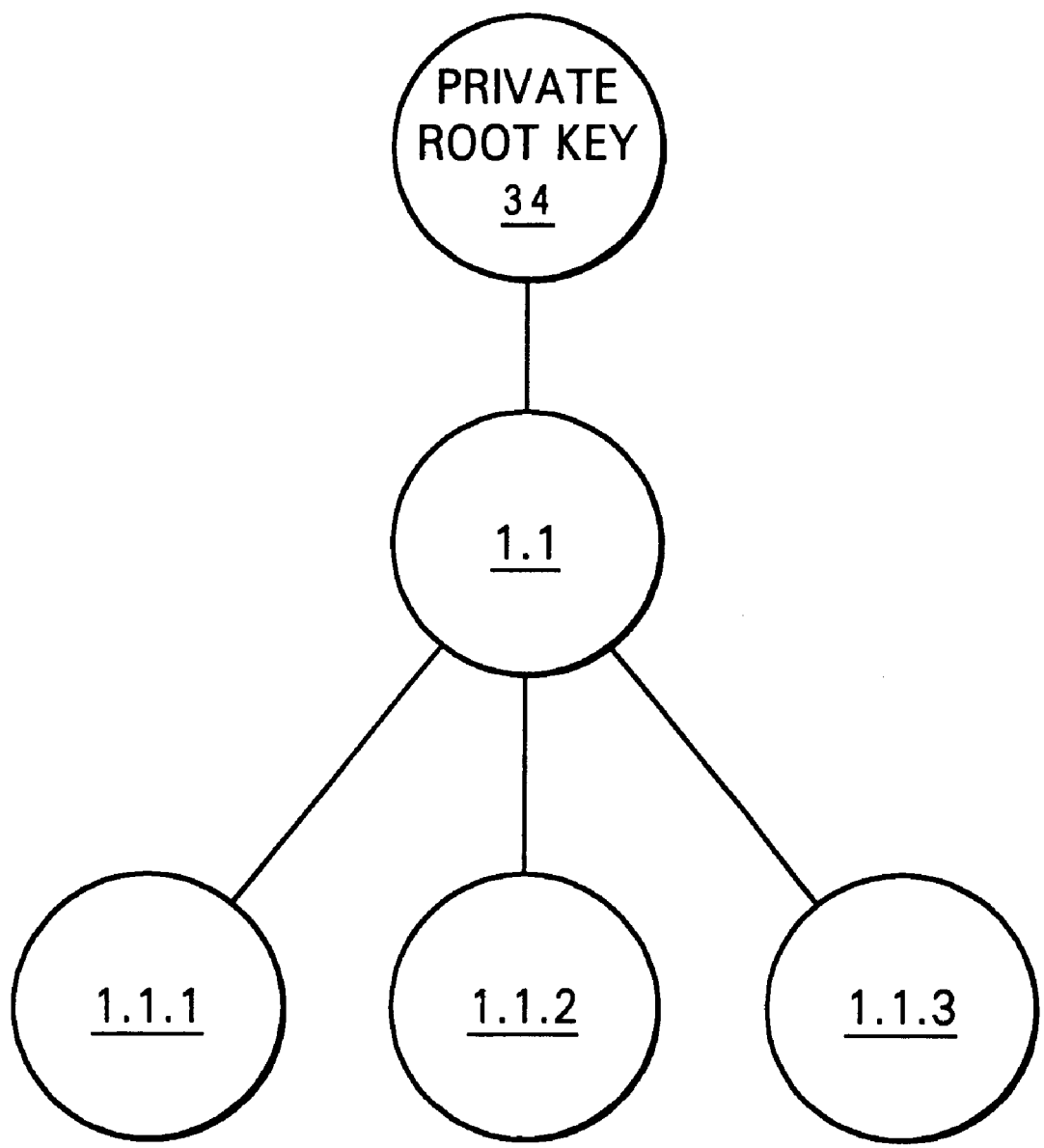
FIG. 2 depicts a relationship among private root, storage and leaf cryptology keys.

When TPM 22 is first implemented by CPU 18, TPM processor 26 generates a private root key and its corresponding public key. The private root key is stored only in TPM 22, and cannot be migrated outside of TPM 22, while the corresponding public key is freely migratable to other computers for use in encrypting messages to client computer 12. TPM processor 26 is also able to generate subsequent private/public keys wrapped with the private root key and its corresponding public key. This relationship between a private root key and subsequent private keys is depicted in FIG. 2.

As stated above, private root key 34 may generate child private keys, such as private key 1.1. Private key 1.1 may also have children, such as private keys 1.1.1, 1.1.2, and 1.1.3. When a private key is the last in a lineage, such as private keys 1.1.1, 1.1.2 and 1.1.3, they are capable of encoding/decoding messages, and are usually referred to as "leaf" keys. Non-leaf keys, such as private root key 1.1, are referred to as "storage" keys, and are capable of generating and storing either child storage keys or leaf keys, but are not able to encrypt/decrypt messages. Private keys that are descendants of private root key 34, such as private keys 1.1, 1.1.1, 1.1.2 and 1.1.3, may be stored outside TPM 22, but only if first encrypted.

Referring again to FIG. 1, server 16 includes components analogous to those described for client computer 12. Server 16 includes an I/O 36, which transmits messages from network 14 to server CPU 38, either directly or via server TPM 40. Server CPU 38 may be a single processor, or preferably is composed of multiple processors. Server CPU 38 is connected to a storage device 42, which is preferably a hard disk drive (HDD) or alternatively any other type of mass data storage device. Server TPM 40 includes a server TPM processor 44 and server TPM memory 46. Server TPM memory 46 is able to store both migratable data 48 and non-migratable 50.

In the present invention, a private key, preferably a private storage key capable of generating additional child private keys, is migrated between the client computer and the server. That is, the private key is preferably generated in client computer 12, and then migrated to server 16. Alternatively, the private key can be generated in server 16 for a user. When the private key from client computer 12 is to be migrated to server 16, the private key is first encoded ("wrapped") with a server non-migratable public key to form a "blob" 52, which is sent to and stored in server TPM 40. The term "non-migratable" describes the feature of the server non-migratable public key that prohibits objects wrapped by the non-migratable public key from subsequently migrating away from the server. The private key can later be "unwrapped" by server TPM 40 to reveal the private key, which can then be wrapped by a non-migratable public key of client computer 12 and transmitted to and stored in client computer 12 as a blob 54. Details of these encryptions are discussed below.

Figure 3:
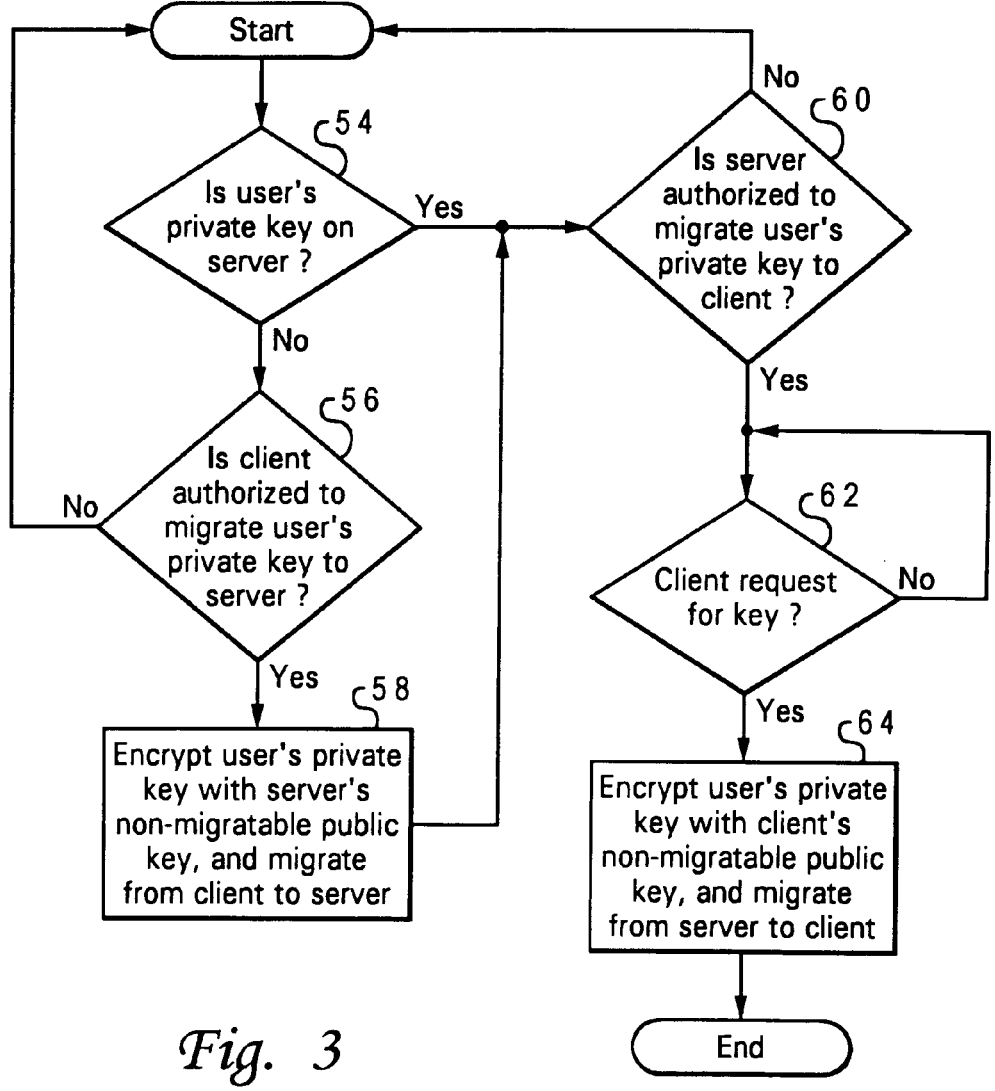
FIG. 3 illustrates a flow-chart of a method for migrating a user's private key between a client computer and a server.

With reference now to FIG. 3, there is depicted a flowchart describing private key migration as utilized by the present invention. As depicted in block 54, a query is made as to whether the user's private key, preferably generated on a client computer, is stored on the server. If not, a query is made, as described in block 56, as to whether the client computer is authorized to migrate the user's private key to the server. If authorized, the client computer migrates the user's private key to the server, as described in block 58. The private key is wrapped with a public non-migratable key of the server to form a first "blob," and the first blob is then sent to the server. Being wrapped with a non-migratable key, the first blob cannot be migrated beyond the server. Of course, the server can unwrap the first blob, revealing the private key for future wrapping and migration, as described below.

Once the private key is migrated to the server, a query is made as to whether the user's private key can be migrated to a specific client computer, as described in block 60.

Authorization describing which specific client computer may receive the user's private key is preferably made by the server's system administrator. If the server is authorized to migrate the user's private key to a specific client computer, then the server stands by waiting for a request from the specific client computer for the user's private key, as described in block 62. If the specific client computer requests the user's private key, the user's private key is wrapped in a non-migratable public key of the client computer into a new blob, and the new blob is transmitted to the specific client computer, as referenced in block 64.

In a preferred embodiment, migrating the user's private key to the server, as depicted in block 58, and requesting the user's private key from the server to a specific client computer, as described in block 62, must first be authorized by the client user. This authorization is preferably performed by transmitting authorization data using keyed-has message authentication code (HMAC), as described by Internet RFC 2104, *HMAC, Keyed-Hashing for Message Authentication*, and ANSI X9.71, *Keyed Hash Message Authentication Code*, herein incorporated by reference and well known to those skilled in the art of cryptology.

With reference now to FIGS. 4*a* and 4*b*, there is depicted graphically the migration of a private key to and from a server. As shown in FIG. 4*a*, a user's private key 70 is migrated from a first client computer 66 to a server 68. User's private key 70, generated either on a client computer or a server, is wrapped with server 68's non-migratable public key 72 to form a blob 71. Blob 71 is migrated from first client computer 66 to server 68, where blob 71 is stored as a non-migratable object. Blob 71 cannot be migrated to any other computer, thus first client computer 66 is assured that other computers will not have unauthorized access to user's private key 70.

As shown in FIG. 4*b*, user's private key 70 can be migrated from server 68 to a second client computer 74, which may or may not be the same device as first client computer 66. To have access to user's private key 70, server 68's non-migratable public key 72 is first stripped off with a server 68 private key (not shown), as described by the dotted line in FIG. 4*a* for non-migratable public key 72. User's private key 70 is then wrapped with second client computer 74's non-migratable public key to form blob 75, which is migrated to second client computer 74. Blob 75 is non-migratable, and the administrator has not authorized the client to use any other computer aside from the server as a migration target, thus assuring the administrator of the server that user's private key 70 will not be subsequently migrated to another device. Second client computer 74 can unwrap second client 74's non-migratable public key 76 to expose user's private key 70 for use by an authorized user of second client computer 74.

As depicted in FIGS. 5*a* and 5*b*, the present invention may also be used to migrate a private key from a first server 80 to a second server 82 where authorized by a system administrator. In a manner analogous to that described for FIG. 4*a*, a user's private key 88 is wrapped by a first server 80 using a second server's non-migratable public key 86 to form a blob 84. Blob 84 is migrated to second server 82. When a third client computer 90 requests user's private key 88, second server's non-migratable public key 86 is stripped off with a second server private key (not shown), exposing user's private key 88. As depicted in FIG. 5*b*, user's private key 88 is then wrapped with third client computer 90's non-migratable public key 92 to form blob 94, which is migrated to third client computer 90. Third client computer 90 may be any authorized client computer, including first client computer 66 and second client computer 74 described in FIGS. 4*a* and 4*b*. First server 80 and second server 82 may be on the same LAN, or they may be in remote locations connected by a WAN such as an Internet.

The present invention thus provides a method and system for managing a user's private key without the need for additional hardware. The private key is migrated from the client computer to a server after first encrypting the private key with a non-migratable server public key, thus ensuring that the private key will not be migrated beyond the server without the user's permission. When migrating the private key back to the user at the same or different client device, the private key is encrypted with a non-migratable public key of the client device, thus ensuring the system administrator that the private key is migrated only to a client device authorized by the system administrator.

It should further be appreciated that the method described above for managing private keys can be embodied in a computer program product in a variety of forms, and that the present invention applies equally regardless of the particular type of signal bearing media utilized to actually carry out the method described in the invention. Examples of signal bearing media include, without limitation, recordable type media such as floppy disks or compact disk read only memories (CD ROMS) and transmission type media such as analog or digital communication links.

While the invention has been particularly shown and described with reference to a preferred embodiment, it will be understood by those skilled in the art that various changes in form and detail may be made therein without departing from the spirit and scope of the invention.

What is claimed is:

1. A method for managing a private key for a user in a free seating environment, said method comprising:

receiving at a first server the private key created by a first computer, wherein said first computer is a client of said first server;

identifying a second computer that is authorized to receive said private key;

transmitting said private key from said first server to said second computer; and wrapping said private key with a non-migratable public key of said first server, thus creating a first blob, before transmitting said private key within said first blob to said first server, such that said private key cannot be migrated from said first server while wrapped with said non-migratable public key of said first server.

2. The method of claim 1, wherein said first computer is a first client computer.

3. The method of claim 1, wherein said second computer is a second client computer.

4. The method of claim 1, wherein said second computer is a second server.

5. The method of claim 1, wherein said first computer and said second computer are a same computer.

6. The method of claim 1, further comprising:
unwrapping said first blob in said first server to expose the private key;
wrapping the private key in said first server, creating a second blob, with a non-migratable public key of said second computer; and
transmitting said second blob to said second computer.

7. The method of claim 1, wherein said first computer is Trusted Computing Platform Alliance (TCPA) compliant.

8. A client computer in a computer network, said client computer comprising:
means for wrapping a private key with a non-migratable public key of a first server to form a first blob, wherein said client computer creates said private key utilizing a Trusted Computing Platform Alliance (TCPA) protocol, and wherein said first blob that cannot be migrated out of said first server; and
means for transmitting said first blob to said first server.

9. The client computer of claim 8, further comprising:
means for requesting said private key from said server;
means for providing a non-migratable public key for encrypting said private key into a second blob; and
means for receiving said second blob.

10. A server in a computer network, said server comprising:
means for providing a public key to another computer;
means for receiving a blab from said another computer, said blob comprising a private key, from said another computer, encrypted with a public key of the server, wherein said private key is created by said another computer utilizing a Trusted Computing Platform (TCPA) protocol;
means for exposing said private key within said server by decrypting said public key;
means for receiving a request for said private key from a requesting computer;
means for wrapping said private key wit a non-migratable public key of said requesting computer to form a blob; and
means for transmitting said blob to said requesting computer.

11. A computer program product, residing on a computer usable medium, for managing a private key for a user in a free seating environment, said computer program product comprising:
program code means for receiving at a first server the private key from a first computer, wherein said private key is created by said first computer utilizing a Trusted Computing Platform (TCPA) protocol;
program code means for identifying a second computer that is authorized to receive said private key;
program code means for transmitting said private key from said first server to said second computer; and
program code means for wrapping said private key with a non-migratable public key of said first server, thus creating a first blob, before transmitting said private key within said first blob to said first server, such that said private key cannot be migrated from said first server while wrapped with said non-migratable public key of said first server.

12. The computer program product of claim 11, wherein said first computer is a first client computer.

13. The computer program product of claim 11, wherein said second computer is a second client computer.

14. The computer program product of claim 11, wherein said second computer is a second server.

15. The computer program product of claim 11, wherein said first computer and said second computer are a same computer.

16. The computer program product of claim 11, further comprising:
program code means for unwrapping said first blob in said first server to expose the private key;
program code means for wrapping the private key in said first server, creating a second blob, with a non-migratable public key of said second computer; and
program code means for transmitting said second blob to said second computer.

* * * * *